(12) United States Patent
Hartog (10) Patent No.: US 7,548,319 B2
(45) Date of Patent: Jun. 16, 2009

(54) INTERFEROMETRIC METHOD AND APPARATUS FOR MEASURING PHYSICAL PARAMETERS

(75) Inventor: Arthur H. Hartog, Southampton (GB)

(73) Assignee: Sensor Highway Limited (GB)

( * ) Notice: Subject to any disclaimer, the term of this patent is extended or adjusted under 35 U.S.C. 154(b) by 473 days.

(21) Appl. No.: 10/544,270

(22) PCT Filed: Jan. 20, 2004

(86) PCT No.: PCT/GB2004/000197

§ 371 (c)(1),
(2), (4) Date: Aug. 3, 2005

(87) PCT Pub. No.: WO2004/070346

PCT Pub. Date: Aug. 19, 2004

(65) Prior Publication Data

US 2006/0146337 A1 Jul. 6, 2006

(30) Foreign Application Priority Data

Feb. 3, 2003 (GB) .................................. 0302434.6

(51) Int. Cl.
*G01B 9/02* (2006.01)
(52) U.S. Cl. ..................................... 356/478; 356/35.5
(58) Field of Classification Search ................ 356/478, 356/35.5, 477, 482; 385/12, 13
See application file for complete search history.

(56) References Cited

U.S. PATENT DOCUMENTS

| | | | | |
|---|---|---|---|---|
| 5,488,475 A | * | 1/1996 | Friebele et al. | 356/478 |
| 5,557,400 A | * | 9/1996 | Sorin et al. | 356/73.1 |
| 5,757,487 A | * | 5/1998 | Kersey | 356/478 |
| 6,208,776 B1 | * | 3/2001 | Prohaska et al. | 385/13 |
| 6,285,446 B1 | * | 9/2001 | Farhadiroushan | 356/35.5 |
| 7,019,837 B2 | * | 3/2006 | Waagaard | 356/478 |
| 2005/0151951 A1 | * | 7/2005 | Hill | 355/67 |

\* cited by examiner

*Primary Examiner*—Tarifur Chowdhury
*Assistant Examiner*—Michael Lapage
(74) *Attorney, Agent, or Firm*—Trop, Pruner & Hu, P.C.; Daryl R. Wright; James L. Kurka (57) ABSTRACT

A method of measuring a selected physical parameter at a location within a region of interest comprises the steps of: launching optical pulses at a plurality of preselected interrogation wavelengths into an optical fiber (1) deployed along the region of interest, reflectors ($2_0$, $2_1$, $2_n$) being arrayed along the optical fiber (1) to form an array (9) of sensor elements, the optical path length between the said reflectors (2) being dependent upon the selected parameter; detecting the returned optical interference signal for each of the preselected wavelengths; determining from the optical interference signal the absolute optical path length (L) between two reflectors (2) at the said location; and determining from the absolute optical path length (L) the value of the selected parameter at the said location; wherein the step of determining the absolute optical path length (L) comprises carrying out a process in which the phase difference between the interference signals for a pair of the preselected wavelengths is estimated using an estimated value for the optical path length (L), the estimated phase difference is used to estimate the phase at each of those wavelengths, and the phase thus obtained is used to revise the estimated value for the optical path length (L), the process being repeated for some or all remaining wavelength pairs in sequence, on the basis of the optical path length (L) estimated for the immediately preceding pair in the sequence, thereby to progressively revise the optical path length (L) until it is know to a desired level of accuracy.

42 Claims, 5 Drawing Sheets

INTERFEROMETRIC METHOD AND APPARATUS FOR MEASURING PHYSICAL PARAMETERS

BACKGROUND

The present invention relates to an interferometric method and apparatus for measuring physical parameters.

Distributed temperature sensors (DTS) are known in which an optical fiber is deployed through a region of interest, light is launched into the fiber, and backscattered optical radiation is used to determine the temperature variation along the fiber. Such distributed temperature sensors have proven to be useful in oil production at determining, for example, flow contributions from different oil producing zones, identifying the location of the ingress of other fluids and the position at which gas breaks out. However, the interpretation of temperature data relies on the contrast between the thermal profile of a flowing well and the geothermal gradient. In those cases where the geothermal gradient is small (e.g. in a horizontal well), then the information may be obtained by inducing a thermal event, which can be tracked, thus revealing the local flow rate. This approach works well in slow-flowing wells. For much higher flow rates some information can be gained from frictional heating effects, but these are very small and the temperature resolution of DTS systems, especially in extended reach-drilling wells, is marginal. The resolution limit of the DTS is of order 0.1° C. for long measurement times. This limits the flow resolution to typically 5000 bpd in a 7" bore.

However, it is thought that much more information would be available if the temperature could be measured to a higher resolution, e.g. 0.01° C. or better.

Moreover, the DTS is relatively slow when set up for best resolution at long range. It is thought that a fast, high resolution temperature measurement might allow either natural, or induced, thermal fluctuations to be tracked and thus provide a more direct indication of flow in fast-flowing wells.

Other measurands would also add to the picture of the well. For example, a measurement of the pressure distribution along the producing interval would allow a precise determination of flow if allied to a density measurement (which might also be obtained from pressure measurements) and some form of mixing. However, pressure sensors with adequate performance for flow determination (e.g. permanent quartz gauges) are expensive and have only limited multiplexing capability.

A solution to these difficulties is now sought on the basis of interferometric interrogation of reflector arrays. This approach is commonly used in fiber-optic hydrophones, which have been deployed for naval applications, as known from Dakin, J. P., Wade, C. A. and Henning, M., 1984, "Novel optical fibre hydrophone array using a single laser source and detector", Electron. Letts, vol. 20, pp 53-54, and from Dakin, J. P. and Wade, C. A., 1984, "Optical Fibre Hydrophone Array—recent progress", Proc. $2^{nd}$ Optical Fibre Sensors Conference, Stuttgart, pp 375-379.

In acoustic measurements, the objective is only to determine an AC signal which is the change in relative phase of the optical reflections from adjacent reflectors in the array. Owing to the AC nature of the signal processing, many problems that are encountered in static measurements are circumvented.

In an interferometric array, reflectors are spaced by typically a few tens of meters. In hydrophones, the AC signal is obtained by exposing the fiber to strain when an acoustic wave is present; the means of transducing a pressure wave into strain might involve wrapping a fiber on an air-backed mandrel. The fiber itself has a moderate sensitivity to pressure waves, even in the absence of such a mandrel. This signal is detected in the surface instrumentation in the form of a variation of the phase as a function of time. This phase signal, which might stretch over more than $2\pi$, conveys information on the instantaneous pressure. The relative phase is, of course, directly related to the optical path length in the section of fiber between the reflectors. However, in acoustic arrays, only changes in the phase are considered. The absolute optical path length is not important and is not measured.

However, if the absolute optical path length between reflectors is known to interferometric precision (i.e. a small fraction of the wavelength of light), then the physical parameters on which it depends (e.g. temperature and strain) can be deduced very precisely. In particular the optical path length depends on the physical length of optical fiber between reflectors and the refractive index separating the reflectors, both of which are sensitive to a variety of external influences. For example, the length changes through thermal expansion and the refractive index varies with temperature through the thermo-optic effect. Likewise, strain obviously affects the length of the fiber, but also the refractive index through the stress-optical effect. In an optical fiber, the index in question, the so-called effective index, takes a value intermediate between that of the core and the cladding, depending on certain waveguiding effects; the latter effects may themselves be dependent on an external physical parameter, but this is thought to be a second order effect.

One problem is that interferometric sensors provide a periodic response to the measurand and their answer is thus ambiguous. Thus the output of the sensor, as a function of the measurand, is nominally sinusoidal, each period being referred to as a fringe. In the typical path length between reflectors, there exist a very large number of fringes and it is then difficult to determine on which fringe the interferometer is presently sited.

As an example, take a wavelength of 1550 nm and a spacing of 10 m between reflectors. The number of fringes between the reflections is of order $1.863 \times 10^7$. If we assume that the sensor can resolve $\frac{1}{1000}$ of a fringe, then the resolution in determining the optical path length would be some $1:1.863 \times 10^{10}$. How this resolution translates into a determination of the quantity of interest (e.g. temperature) will of course depend on the sensitivity of the optical path length to that parameter. In the above example, the temperature resolution would be better than 1 mK. However, unless the measurement system is able to determine the fringe order, this very high resolution is meaningless. In contrast, an acoustic sensor merely needs to track changes in the fringe order over an acoustic period (a few ms).

The key to the present approach involved in determining the absolute optical length between reflectors is therefore to resolve the fringe order ambiguity over such a large number of fringes.

BRIEF SUMMARY

According to a first aspect of the present invention there is provided a method of measuring at least one selected parameter at a location within a region of interest, which method comprises the steps of: launching optical pulses at a plurality of preselected interrogation wavelengths into an optical fiber deployed along the region of interest, reflectors being arrayed along the optical fiber to form an array of sensor elements, the optical path length between the said reflectors being dependent upon the selected parameter; detecting the returned optical interference signal for each of the preselected wavelengths; and determining from the optical interference signals the absolute optical path length between two reflectors at the said location, and from the optical path length so determined the value of the selected parameter at the said location.

The step of determining the absolute optical path length preferably comprises carrying out a process in which the derivative of the phase as a function of wavelength is estimated from a subset of the interference signals, using the derivative and an estimated value for the optical path length to estimate the phase relationship between the interference signals, and the phase relationship thus obtained is used to revise the estimated value for the optical path length, the process being repeated for increasing subsets of the remaining wavelengths in sequence, on the basis of the optical path length estimated for the immediately preceding subset in the sequence, thereby to progressively revise the optical path length until it is known to a desired level of accuracy. In one embodiment, at least one of the subsets comprises a pair of the interference signals.

The optical fiber preferably comprises polarization-maintaining fiber. Desirably, light is launched into the fiber in such a way that the power of the light signal is substantially equally divided between the orthogonally-polarised propagation modes of the fiber, thereby to interrogate each principal state of polarization of the fiber simultaneously, the return interference signals from both principal states of polarization being used separately in the said process for determining the absolute optical path length for each propagation mode independent of the other mode.

Alternatively, light is launched into the polarization-maintaining fiber in such a way that the power of the light signal is firstly directed entirely into one of the principal states of polarization and then the other, thereby to interrogate the principal states of polarization sequentially, the returned interference signals from both principal states of polarization being used separately in the said process for determining the absolute optical path length for each propagation mode independent of the other mode.

In both cases the effect is to provide two independent interferometric arrays by means of a single fiber, therefore doubling the number of measurements available from which to obtain the optical path length and to separate the effects of multiple measurands.

In some embodiments, the selected parameter may comprise temperature. In this respect, the method may be used to monitor fluid flow by detecting changes in temperature of the flowing fluid. In an example, the region of interest may lie within a pipeline, and the method may further comprise identifying any temperature variation within the pipeline from the determined value of the temperature at the said location, where temperature variations are indicative of a change of flow of a fluid in the pipeline. The change of flow may arise from a leak of fluid into or out of the pipeline, so that the method comprises identifying a leak at the said location from the identification of a temperature variation at that location. Alternatively, the change of flow may arise from a constriction in the pipeline, and the method comprises identifying a constriction at the said location from the identification of a temperature variation at that location.

In another embodiment, the selected parameter may comprise strain. Birefringent optical fiber can be used to detect strain, so that the optical fiber may be a high-birefringence fiber, the birefringence of which changes in response to strain applied to the optical fiber. In the event that the birefringence of the high-birefringence fiber also changes in response to temperature, the method may further comprise compensating the returned optical interference signal for effects arising from temperature at the said location. This allows the sensitivity of high-birefringence fiber to be exploited to obtain accurate strain measurements, without accuracy being comprised by the cross-sensitivity to temperature that can be demonstrated by such fiber.

An embodiment of the invention used to measure strain may comprise the method wherein the region of interest lies on the surface of a component in an oil well, and the method further comprises identifying movement of the component from the determined value of strain.

In yet further embodiments, the selected parameter may comprise pressure. Advantageously in this regard, the said optical fiber may comprise a side-hole fiber from which accurate pressure measurements can be obtained. Further, each sensor element of the fiber may be located within a sealed elliptical tube filled with a pressure-transmitting fluid. This allows each element to be isolated from adjacent elements, so that different pressures can be measured. The pressure-transmitting fluid allows good pressure communication to the fiber despite the isolation provided by the tubes.

In an example application, the region of interest lies within a pipeline and the method comprises deploying two or more such optical fibers at different azimuths around an inner surface of the pipeline, and determining a density of fluid in the pipeline from the values of pressure determined for each optical fiber. In an alternative application, the region of interest lies within a pipeline and the method comprises deploying two or more such optical fibers at difference azimuths around an inner surface of the pipeline, and determining an orientation of the pipeline and/or the optical fibers from the values of pressure determined for each optical fiber.

In some embodiments, the selected parameter may depend on a localized event moving along the region of interest, and the method may comprise determining the value of the selected parameter over time at more than one said location, and determining the movement of the localized event from the determined values of the selected parameter. In this way, the rate of flow of a fluid along the region of interest may be measured or monitored, perhaps to detect the presence of an abnormality that affects flow. The localized event may be a user-induced event, so that the method further comprises inducing the localized event. For example, a volume of fluid may be heated or cooled, or a bubble created to form a volume of lower density. Whether the event is user-induced or naturally occurring, the localized event may be a volume of fluid within the region of interest that has a different temperature, pressure, or density from surrounding fluid in the region of interest, the selected parameter being temperature, pressure, or density, respectively.

In further embodiments, at least two selected parameters are measured simultaneously. For example, temperature may be measured with pressure or with strain. In some cases this can be achieved with a single optical fiber which gives optical interference signals from which more than one parameter may be determined. Alternatively, two fibers may be used, so that the method may further comprise the steps of launching optical pulses at a plurality of wavelengths into an additional optical fiber deployed along the region of interest, reflectors being arrayed along the additional optical fiber to form an additional array of sensor elements, the optical path length between the said reflectors being dependent upon a further selected parameter; detecting the returned optical interference signal from the additional optical fiber for each of the preselected wavelengths; and determining from the optical interference signal the absolute optical path length between two reflectors at the said location, and from the optical path length so determined the value of the further selected parameter at the said location.

The said optical fiber and the said additional optical fiber may share the same fiber jacket. Alternatively, the said optical fiber and the said additional optical fiber may be constituted by a single fiber sensitive to both parameters, the fiber having two cores. These arrangements offer ease of deployment, since both fibers/cores can be deployed in a single deployment step.

Moreover, in any of the above embodiments and examples, the measured value for the parameter may be used to determine the value for a further measurand dependent upon the measured parameter. This increases the scope of the method, since it allows parameters to be measured which in themselves are not operable to affect the optical path length in a determinable way. For example, the said optical fiber may be provided with a coating which responds to the said further measurand by stretching or shrinking. This will change the strain to which the fiber is subjected, and hence alter the path length, from which the further measurand can be determined.

Alternatively, the said coating may be electro-strictive, or magneto-strictive. This allows the measurement of electric or magnetic fields. In a further alternative, the said coating may be sensitive to a selected chemical measurand.

A method embodying the present invention may further comprise the steps of launching optical pulses at a fixed wavelength into the optical fiber and using the returned interference signal to determine high frequency phase changes. This may be achieved in any convenient manner, for example by providing an auxiliary fiber for the fixed wavelength pulse so that the method may further comprise the steps of launching optical pulses at a fixed wavelength into an auxiliary optical fiber deployed along the region of interest, reflectors being arrayed along the fiber to form an auxiliary array of sensor elements; and using the returned interference signal from the auxiliary optical fiber to determine high frequency phase changes. The auxiliary fiber may have a coating designed to enhance acoustic sensitivity. Such high frequency phase changes are preferably used to correct for dynamic errors in the returned optical interference signals.

In a method embodying the present invention, the returned optical interference signal is preferably processed to remove the cross-talk term, the cross-talk term being removed for each of n sensor elements by subtracting the cross-talk phasor for the nth sensor element from the measured nth sensor element phasor, the cross-talk phasor being estimated from the phase of all previous sensor elements in the array. The removal process begins with subtraction of the cross-talk phasor for the second sensor element from the measured second sensor element phasor, the cross-talk phasor for the first sensor element in the array being zero.

The embodiments of the first aspect of the present invention are particularly suitable for use in the oil industry, for downhole monitoring applications in well bores. Optical fibers are able to withstand the rigours of the downhole environment to give accurate measurement results, and the method provides techniques for measuring parameters of special interest in oil production, including temperature, fluid flow, pressure and strain. Therefore, the region of interest may lie within an oil well. In some examples, the oil well may be a horizontal oil well.

According to a second aspect of the present invention, there is provided apparatus for measuring a selected physical parameter at a location within a region of interest, which apparatus comprises: an optical fiber for deployment along the region of interest, the optical fiber having reflectors therealong forming an array of sensor elements, the optical path length between the said reflectors being dependent upon the selected parameter; source means operable to launch optical pulses at a plurality of preselected interrogation wavelengths into the said fiber; signal detection means operable to detect the returned optical interference signal for each of the preselected wavelengths; and signal processing means operable to determine from the optical interference signal the absolute optical path length between two reflectors at the said location and to determine from the optical path length so determined the value of the selected parameter at the said location.

In one embodiment, the signal processing means are operable to determine the absolute optical path length by carrying out a process in which the derivative of the phase as a function of wavelength is estimated from a subset of the interference signals, using the derivative and an estimated value for the optical path length to estimate the phase relationship between the interference signals, and the phase relationship thus obtained is used to revise the estimated value for the optical path length, the process being repeated for increasing subsets of the remaining wavelengths in sequence, on the basis of the optical path length estimated for the immediately preceding subset in the sequence, thereby to progressively revise the optical path length until it is known to a desired level of accuracy. In one embodiment, at least one of the subsets comprises a pair of the interference signals.

The said optical fiber may comprise polarization-maintaining fiber, and the apparatus further comprises power launching means operable to launch the optical pulses into the fiber in such a way that the power of the optical pulses is substantially divided between the orthogonally-polarised propagation modes of the fiber, thereby to interrogate each principal state of polarization of the fiber simultaneously; and the signal processing means being operable to use the returned optical interference signals from both principal states of polarization separately to determine the absolute optical path length for each propagation mode independent of the other mode. Alternatively, the said optical fiber may comprise polarization-maintaining fiber, and the apparatus further comprises a polarization modulator operable to launch the optical pulses into the fiber in such a way that the power of the optical pulses is firstly directed entirely into one of the principal states of polarization of the fiber and then the other, thereby to interrogate the principal states of polarization sequentially; and the signal processing means being operable to use the returned optical interference signals from both principal states of polarization separately to determine the absolute optical path length for each propagation mode independent of the other mode.

In some embodiments, the parameter comprises temperature. In this context, the region of interest may lie within a pipeline, and the signal processing means may be further operable to identify any temperature variation within the pipeline from the determined value of the temperature at the said location, where temperature variations are indicative of a change of flow of a fluid in the pipeline. The change of flow may arise from a leak of fluid into or out of the pipeline, and the signal processing means may be operable to identify a leak at the said location from the identification of a temperature variation at that location, for example. Alternatively, the change of flow may arise from a constriction in the pipeline, and the signal processing means may be operable to identify a constriction at the said location from the identification of a temperature variation at that location.

In other embodiments, the parameter comprises strain. The optical fiber may comprise a high-birefringence fiber, the birefringence of which changes in response to strain applied to the optical fiber. In the event that the birefringence of the high birefringence fiber also changes in response to temperature, the signal processing means may be further operable to compensate the returned optical interference signal for effects arising from temperature at the said location.

The region of interest may lie on the surface of a component in an oil well, and the signal processing means may be further operable to identify movement of the component from the determined value of strain.

In further embodiments, the parameter comprises pressure. In such embodiments, the said optical fiber may comprise a side-hole fiber (see Xie, H. M., Dabkiewicz, Ph., Ulrich, R. and Okamoto, K. "Side-hole fibre for fiber-optic pressure sensing", Optics Letters 1986, vol. 11, p 333). Further, each sensor element of the fiber may be located within a sealed elliptical tube filled with a pressure-transmitting fluid.

Applications of apparatus configured in this way in those in which the region of interest lies within a pipeline; the apparatus comprises two or more such optical fibers for deployment at different azimuths around an inner surface of the pipeline; and the signal processing means is operable to determine a density of fluid in the pipeline from the values of pressure determined for each optical fiber. Other applications include those in which the region of interest lies within a pipeline; the apparatus comprises two or more such optical fibers for deployment at different azimuths around an inner surface of the pipeline; and the signal processing apparatus is operable to determine an orientation of the pipeline and/or the optical fibers from the values of pressure determined for each optical fiber.

In some embodiments, the selected parameter may depend on a localized event moving along the region of interest, and the signal processing means may be operable to determine the value of the selected parameter over time at more than one said location, and to determine the movement of the localized event from the determined values of the selected parameter. The localized event may be a user-induced event. The localized event may be a volume of fluid within the region of interest that has a different temperature, pressure, or density from surrounding fluid in the region of interest, the selected parameter being temperature, pressure, or density, respectively.

In some examples, the apparatus may further be for measuring a second selected physical parameter at the location within the region of interest, wherein said optical path length between the said reflectors is further dependent upon the second selected parameter; and the signal processing means is further operable to determine the value of the second selected physical parameter from the determined absolute optical path length.

Apparatus embodying the present invention may further comprise at least one additional optical fiber provided for deployment through the region of interest, reflectors being arrayed along the additional optical fiber to form an additional array of sensor elements, the said additional optical fiber being suitable for measurement of a different physical parameter to that for which the other fiber is provided. Preferably, the fibers share the same fiber jacket. Alternatively, they may be constituted by a single fiber sensitive to both parameters, the fiber having at least two cores.

Apparatus embodying the present invention may be operable to use the measured value for the parameter to determine a value for a further measurand dependent upon that parameter.

In this regard, the optical fiber may be provided with a coating which responds to the further measurand by stretching or shrinking. For example, the coating may be electro-strictive, magneto-strictive or designed to be sensitive to a selected chemical measurand.

In apparatus embodying the present invention the source means are preferably also operable to launch light at a fixed wavelength and at a varying wavelength into the fiber, the signal processing means being operable to use the interference signal from interrogation at the fixed wavelength to determine high frequency phase changes. In such a case the apparatus may further comprise an auxiliary optical fiber for deployment through the region of interest, reflectors being arrayed along the fiber to form an auxiliary array of sensor elements, the source means being operable to launch the fixed wavelength, signal into the auxiliary fiber. Preferably, the auxiliary fiber has a coating designed to enhance acoustic sensitivity. The apparatus embodying the present invention may also launch light at a variable wavelength concurrently with the launch of the fixed wavelength. The signal processing means may be further operable to use the high frequency phase changes to correct for dynamic errors in the returned optical interference signals.

The signal processing means may be further operable to process the returned optical interference signal to remove the cross-talk term, the cross-talk term being removed for each of the n sensor elements by subtracting the cross-talk phasor for the nth sensor element from the measured nth sensor element phasor, the removal process beginning with subtraction of the cross-talk phasor for the second sensor element from the measured second sensor element phasor, the cross-talk phasor for the first sensor element in the array being zero. In some embodiments, the region of interest may lie within an oil well. The oil well may be a horizontal oil well.

According to a third aspect of the present invention, there is provided a method of measuring a parameter in an optical fiber interferometric array, comprising launching optical pulses into the array, creating an interference signal within sensor elements in the array, detecting the phase of the interference signals, wherein the returned optical interference signal is processed to remove the cross-talk term, the cross-talk term being removed for each of n sensor elements by subtracting the cross-talk phasor for the nth sensor element from the measured nth sensor element phasor, the removal process beginning with subtraction of the cross-talk phasor for the second sensor element from the measured second sensor element phasor, the cross-talk phasor for the first sensor element in the array being zero.

BRIEF DESCRIPTION OF THE DRAWINGS

Reference will now be made, by way of example, to the accompanying drawings, in which.

DETAILED DESCRIPTION

Figure 1:
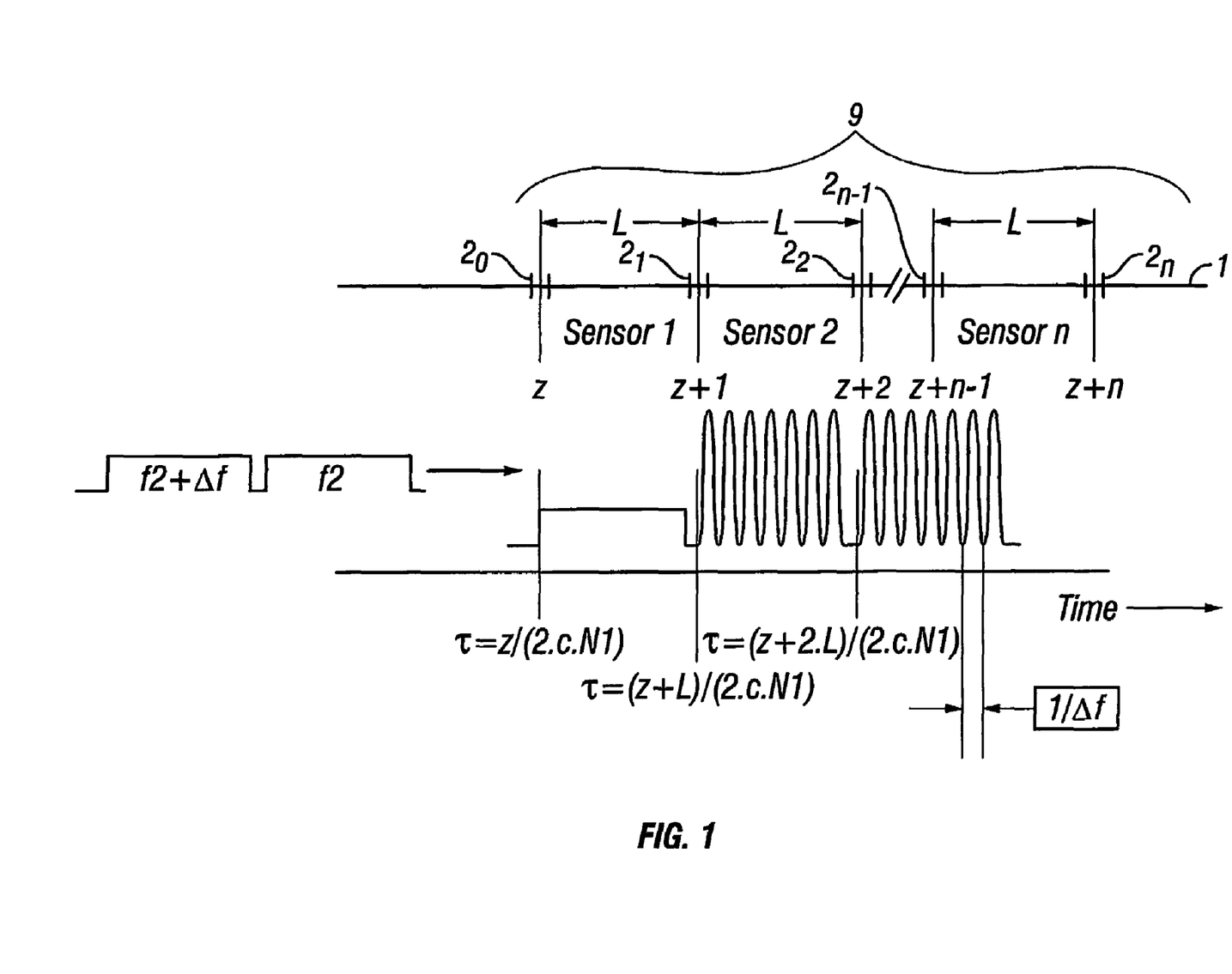
FIG. 1 shows a schematic diagram of an optical fiber sensor array.

FIG. 1 illustrates an array of reflectors $2_0, 2_1, \ldots 2_n$, separated by a distance L (approximately constant), imposed onto an optical fiber. The section of fiber between each pair of reflectors $2_0$, $2_i$, etc. constitutes a sensor element. The reflectors are intended to be quite weak, for example of order 0.1% reflectivity, partly to reduce losses to subsequent sensor elements, but also to reduce cross-talk between the elements.

Cross-talk between adjacent sensor elements is a seriously limiting factor in acoustic sensor arrays in the purely reflectometric arrangement. However, the simplicity of the arrangement, including the reduced number of fibers to be taken to the surface and absence of components such as downhole couplers make it extremely attractive in the present context. The trade-off is that the reflectivity of each reflector must be reduced to limit cross-talk, which of course then impacts on the signal-to-noise ratio that can be achieved. However in this case, provided that high-performance acoustic measurements are not required, then the simplicity of the downhole configuration make it extremely attractive.

In order to address the cross-sensitivity between the different factors affecting optical path length, it is proposed to use polarization-maintaining fibers and to measure the optical path length separately for each of the two principal states of polarization (SOP).

A polarization-maintaining fiber is one which is designed to be highly asymmetric; the asymmetry ensures that a large difference exists between the propagation constants of orthogonally-polarised modes. Owing to the difference in propagation constants, there is minimal power conversion between the modes, which thus propagate essentially independently one of the other. The fiber can be designed to be strongly differentially sensitive to certain measurands for the two SOPs. The side-hole fiber is one such example, where the optical path-length difference between the principal SOPs varies markedly as a function of external pressure. An auxiliary benefit of using this polarization-maintaining fiber (which is significantly more expensive than conventional fiber) is that the problem, commonly found in hydrophone arrays, of ensuring that the polarization states of the light from adjacent reflectors are aligned, is circumvented.

Of course, using the difference between the optical path lengths in a birefringent fiber is a well-known method of performing interferometry in that it ensures a common path for the arms of the interferometer and also (in birefringent fibers) the state of polarization of the combining waves is well controlled. This approach is known in the literature as polarimetry. It is however fundamentally different from what is proposed here: conventional polarimetry forms the difference in optical path length between the two optical paths directly in the optical domain and only this difference is measured. In contrast, in the present proposal, the absolute optical path length of each optical path is measured and the resulting information is processed digitally to provide independent determinations of two measurands. Alternative approaches are based on comparing the relative path lengths of the two lowest modes of a fiber, usually designed to guide only a few such spatial modes.

Assuming the fiber 1 is therefore to be polarization-maintaining, we shall consider each polarization separately. As implied in FIG. 1, the spacing between reflectors is approximately constant. Although multiples of L would also work, only those sections between reflectors 2 spaced by L would be measured.

As mentioned above, interferometric sensors provide a periodic, and thus ambiguous, response. In order to remove the ambiguity, the present invention repeats the measurement at a series of different carrier frequencies, $f_c \pm f1$. The process of establishing a relationship (without $2\pi$ ambiguity) between the phase at each of the carrier frequencies is referred to as unwrapping. In this way, the variation of the phase as a function of carrier frequency can be determined. Its derivative is the group delay, $\tau = L/c \times N$, where N is the group index and c the speed of light in vacuo. Since the relationship between group and phase indices is known, or can be measured, the phase index can be obtained. Alternatively, the group data can be used directly as an indicator of the physical parameters that are required to be measured.

In particular, for each frequency, the following holds:

The total phase difference between adjacent reflectors separated by distance L is given by:

$$\Phi(\lambda): = 4 \cdot \pi \cdot L \cdot \frac{n(\lambda)}{\lambda} \qquad (1)$$

where $n(\lambda)$ is the effective refractive index for the waveguide structure. Differentiating with respect to wavelength 8, gives:

$$\frac{d}{d\lambda}\Phi(\lambda): = -4 \cdot \pi \cdot \frac{L}{\lambda^2} \cdot N(\lambda) \qquad (2)$$

Here $N(\lambda)$ is the group index of refraction (which dictates the speed of information transfer, as opposed to that of the waves for the phase index $n(\lambda)$).

Combining (1) and (2), it follows that:

$$\Phi(\lambda): = \lambda \cdot \frac{n(\lambda)}{N(\lambda)} \cdot \frac{d}{d\lambda}\Phi(\lambda) \qquad (3)$$

Thus, according to an embodiment of the present invention, the following steps are carried out in order to obtain a value for the absolute optical path length:

Firstly, light at a first series of wavelengths is launched into the fiber to thereby acquire a series of phase measurements at various wavelengths. Some of these must be closely-enough spaced that they can be unwrapped (i.e. the phase determined) unambiguously from available a priori knowledge of L. Typically, L will be known a priori to a few %.

Then, using two or more such closely-spaced wavelengths, $d\Phi/d\lambda$ is estimated, and using this value for $d\Phi/d\lambda$, and the known values for $n(\lambda)$ and $N(\lambda)$, equation (3) is used to estimate the phase $\Phi(\lambda)$ at each of the two wavelengths.

Then, from inverted equation (1) a revised estimate of L at one or both of the wavelengths can be obtained on the basis of the estimated value for $\Phi(\lambda)$.

Figure 2:
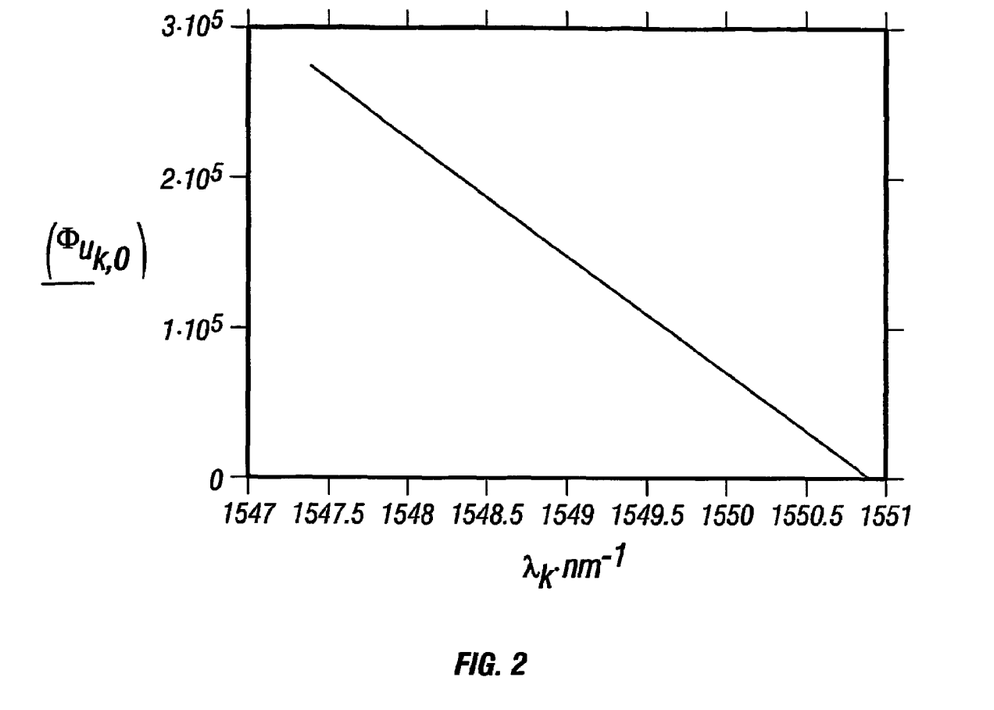
FIG. 2 shows a plot of unwrapped phase against wavelength.

The newly-estimated value for $\Phi(\lambda)$ is then used to improve the accuracy of $d\Phi/d\lambda$ and the steps above are repeated for all the data from the measurements at the first series of wavelengths. The process is then repeated at a second series of wavelengths, shifted from the first series of wavelengths, until the phase has been unwrapped over the range of interrogation wavelengths, as illustrated for example in FIG. 2, and the unwrapped phase is used to improve the estimate of the optical path length until this estimate is of adequate quality to unwrap the phase to DC (zero frequency).

Figure 3:
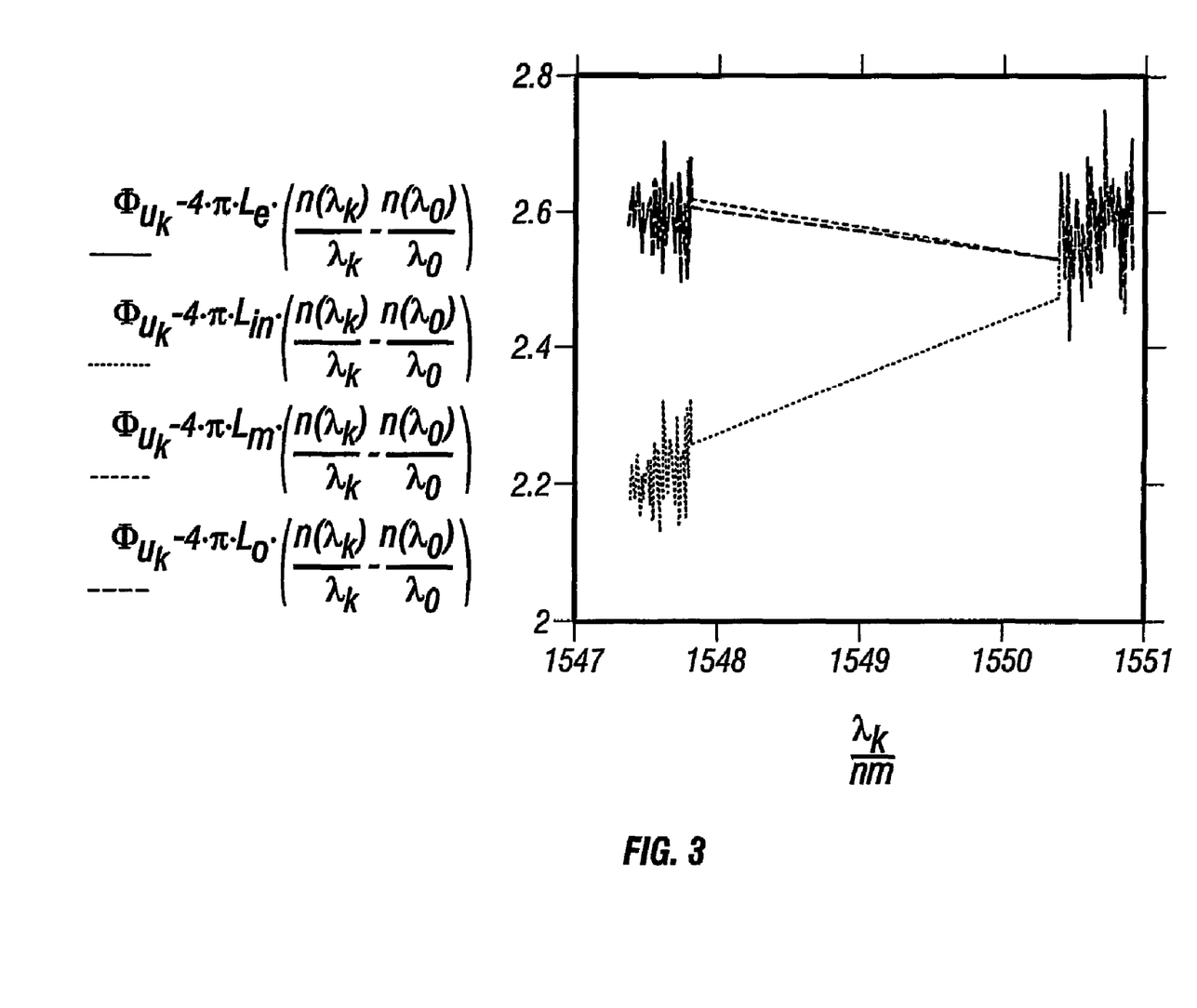
FIG. 3 shows a plot of phase against wavelength.

To unwrap the phase down to DC, it is assumed that the unwrapped phase less a phase synthesised from the current length estimate must be flat with wavelength. Thus, a fit of this residual phase vs. wavelength may be used to correct the length estimate and thus compute the number of wavelengths (or fringes) in the sensor element. That is, measuring the slope of the function given by the difference between the actual unwrapped phase and the unwrapped phase calculated from the latest estimate of the optical path length, as illustrated for example in FIG. 3, gives a measure of the correction required to ensure that the unwrapped phase is equal to that which is calculated from the optical path length.

Once the absolute phase is known at any (and thus all) wavelengths, the length is calculated for each wavelength sampled. The average of all such calculated lengths provides the best estimate for the optical path length (assuming equal uncertainty for each phase measurement).

Thus, the above procedure essentially bootstraps from closely spaced frequencies (which have little risk of unwrapping errors, but provide poor resolution of the length) to increasing frequency spacings which provide a longer baseline to estimate phase differences. Ultimately, it is necessary to span a sufficiently wide range that the phase can be unwrapped with confidence down to DC. However the frequency sampling pattern must be such that the entire chain from the closest frequencies to the most widely spaced are accurately unwrapped.

The procedure may be generalized and a set of data acquired at frequencies of appropriate spacing such that the phase relationship between all data in the set can be established and from this phase relationship the absolute length L between the reflectors determined to within one fringe. The specific unwrapping procedure detailed above is but one example of an approach to determining the absolute length.

Errors in the results can be decreased by increasing the number of frequencies sampled. This, however has the drawback that the acquisition time is increased, and this may be undesirable since the extreme sensitivity of the system implies that all measurements must be made far faster than the measurand is likely to vary the phase by a significant amount. It may therefore be necessary to accept a certain error rate and then apply a non-linear filter to reject outliers.

Figure 4:
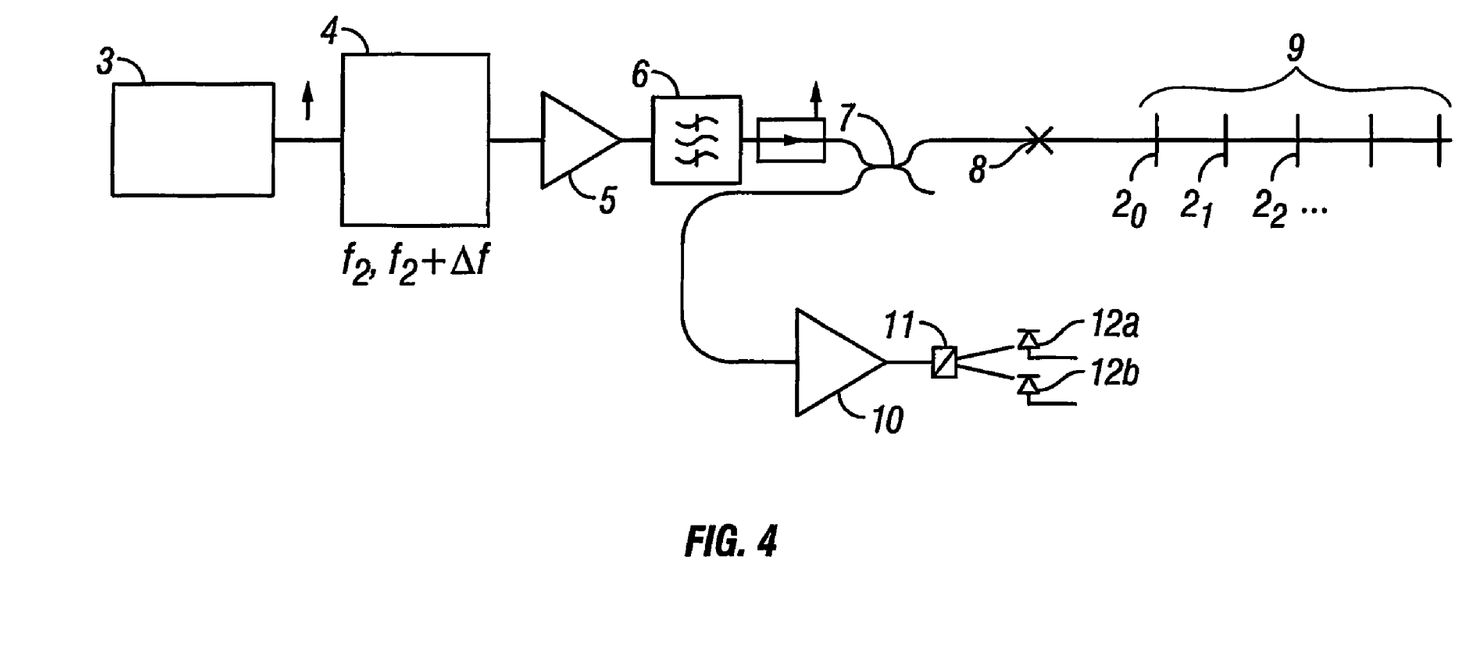
FIG. 4 shows apparatus for use in carrying out a method embodying the present invention.

The optical arrangement which is proposed to accomplish these measurements is shown in FIG. 4. A narrow band laser 3 is used as an oscillator and delivers a very pure, single frequency, tone to the rest of the system at a carrier frequency $f_c$. The laser 3 is tunable (i.e. of variable frequency) so that successive measurements can be accomplished with different carrier frequencies. The interrogating light is preferably a dual pulse, timed so that the reflection of the first pulse off the remote reflector 2 of any given sensor element coincides with the reflection of the second pulse off the nearer of the reflector pairs. The frequencies of these pulses are f2 and f2+$\Delta$f, where the frequency difference $\Delta$f is small compared with optical carrier frequency. Whilst it is not necessary for the pulses to be at slightly different frequencies, a frequency shift between the pulses may make the interpretation of the phase simpler, lifts certain ambiguities and makes the signal recovery less dependent on the strength of the reflectors 2. For a spacing L=10 m, the corresponding round-trip time between reflectors 2 is roughly 100 ns and a frequency shift of 10 MHz is required for the signal to show a full cycle (the seven cycles shown in the diagram thus correspond to $\Delta$f~70 MHz). The beat frequency is exactly equal to the difference in frequency of the two pulses and is thus known to a high level of precision. It follows that by sampling the optical return signals, the relative phase for each reflector pair can be determined modulo $2\pi$.

Thus, the continuous output of the laser 3 is converted to a dual pulse, with a defined frequency difference $\Delta$f between the two pulses, by a dual-pulse modulator 4. The resulting pulse pair is amplified to a peak power approaching the non-linear limit by an amplifier 5, bandpass-filtered by bandpass filter 6 to eliminate unwanted amplified spontaneous emission, and launched into the sensor array 9 via some form of directional coupler 7 (e.g. fiber coupler, circulator, or bulk-optic arrangement). Preferably, all the fiber components must be made from polarization-maintaining fiber and the power launched on-axis. At some point—either in the instrument or immediately prior to the array 9 (or at a convenient place in between) the power is converted to equal power in the orthogonal modes, most easily accomplished with a splice 8 at 45° between successive fiber sections. This means that the two interferometers in each sensor element formed by each principal SOP are interrogated simultaneously. Alternatively, it would be possible to use a polarization modulator in the instrumentation to switch the SOP from one principal axis to another and interrogate the SOPs sequentially. The light returned from the sensor array 9 is sent, via the directional coupler 7 and an optical preamplifier 10, to polarization splitter 11, which selects the orthogonal linear states of polarization and sends each to a separate detection system 12a, 12b.

As explained above, the principle of the measurement technique requires that the frequency of the carrier be varied. There are several forms of tunable laser available commercially. For example, distributed feedback (DFB) lasers made from rare-earth-doped optical fiber exhibit narrow linewidth and are tunable either through stretching (e.g. with piezo-electric actuators) or by changing their temperature. Alternatively, special designs of semiconductor DFB lasers allow separate frequency and power control. It may be preferred to use one or more fixed-frequency lasers, and then modulate their output to generate electronically-controlled side-bands which are then filtered to isolate programmable optical frequencies. This is the approach illustrated in FIG. 5.

Figure 5:
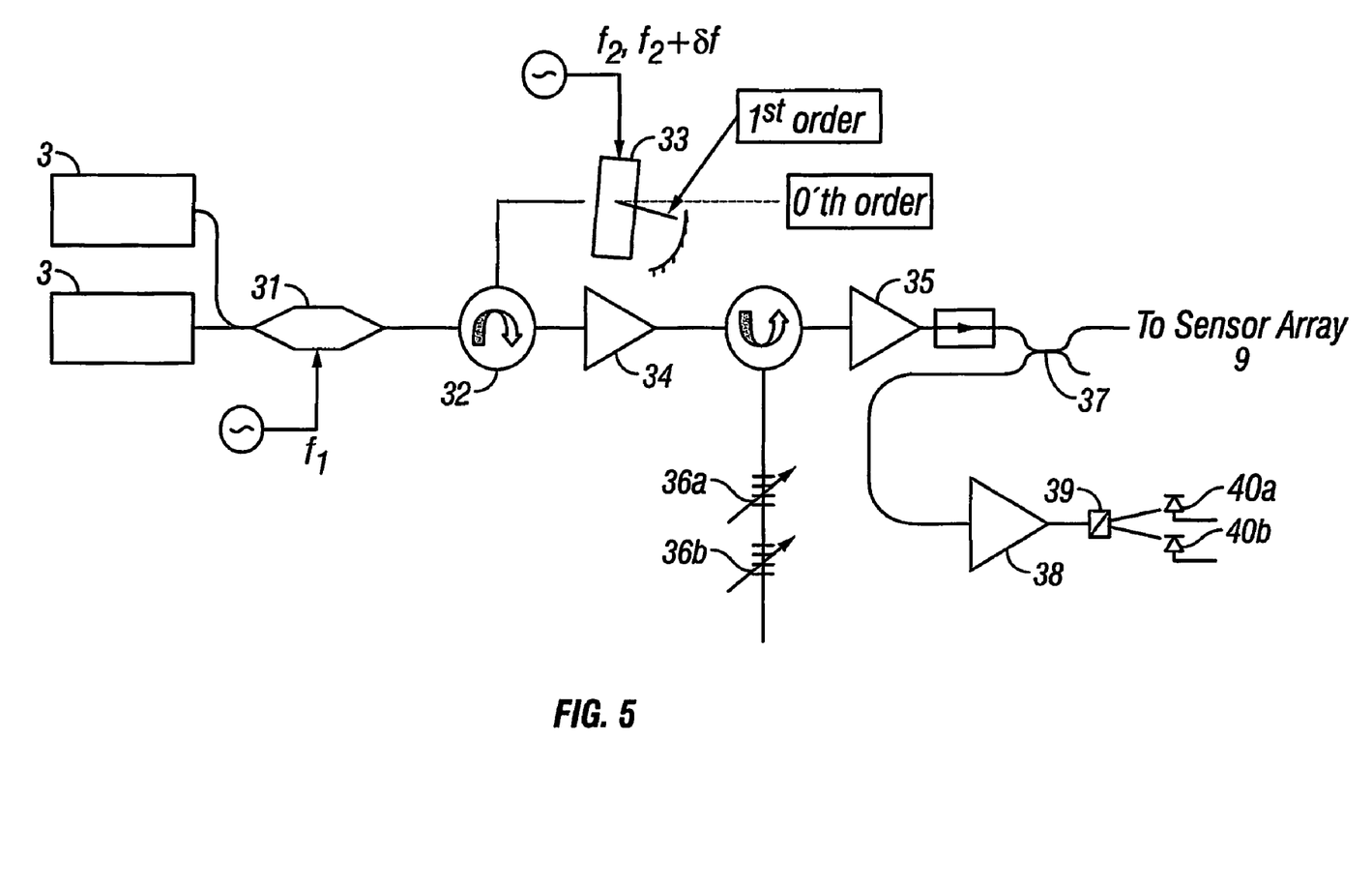
FIG. 5 shows apparatus for use in carrying out a method embodying the present invention in more detail.

The output of the laser 3 is passed through a modulator 31 which generates side-bands, for example an integrated-optic modulator which presently has the widest modulation bandwidths. The position of the sidebands is determined by a first RF frequency f1 input to the modulator 31 and can thus be controlled. An acousto-optic deflector (AOD) 33 used as a modulator is configured in double-path configuration both to chop a pulse pair from the output of the first modulator 31 and also to provide a differential frequency shift $\Delta$f between the pulses in the pair by control of a second RF frequency f2. Use of the AOD 33 in double-pass configuration doubles the frequency shift $\Delta$f applied to f2. A circulator 32 is used to access the AOD 33, but could of course be replaced by a coupler at lower cost if the accompanying loss in signal strength was acceptable (or polarization-maintaining circulators are not available). Alternatively, the construction could be made in bulk optics.

Tunable fiber Bragg gratings 36a, 36b are provided and are used to select just one of the sidebands. They are placed between stages of amplification 34, 35, which bring the signal up to a few hundred mW, close to the non-linear limit. This is then launched into the sensor array 9, possibly through a downlead consisting of polarization-maintaining fiber. At some point, either at the entrance to the downlead or where the sensor array 9 proper starts, there must be a ~45° rotation of the fiber axes so as to ensure that power is launched in both axes. On the return path, the reflected light from the sensor array 9—after passing through a directional coupler 37 and in this embodiment an optical preamplifier 38—is sent to a polarization splitter 39, which selects the orthogonal linear states of polarization and sends each to a separate detection system, 40a, 40b.

The frequency range that the system can span will determine its ability to resolve ambiguity over a wide range of distances L. As illustrated, variation of the RF frequency f2 will allow the frequency to be swept over a small range (typically, ±10-15% of the centre RF frequency f2). Wider frequency deviation may be achieved by varying f1. For example, integrated optic modulators (IOM) are available with bandwidths approaching 20 GHz. Thus a given sideband can be swept over a range of, say, 10 GHz and by selecting the other sideband a total span approaching 40 GHz can be covered. However, this is unlikely to be sufficient to resolve fringe ambiguities in sensor elements of L=10 m. A wider span still can be achieved either by addition of further lasers at selected wavelengths different from the first, or by tuning the wavelength of the original source, as illustrated in FIG. 3. Modelling suggests that two sets of samples each spanning 40 GHz and separated by 300-400 GHz would be adequate to resolve fringe ambiguities in L=10 m, assuming an uncertainty on each phase reading of order 10 mrad.

Whichever approach is adopted to generating a programmable optical frequency, the laser(s) should be locked to precise, stable, wavelengths (this is particularly important where more than one source is used, or a single source is tuned).

There are two principal reasons for stabilising the laser frequency. The first is to ensure that the several measurements of the phase are mutually consistent in order that these measurements samples might be reconstructed into an absolute measurement of L. Unless the successive measurements apply to source frequencies which are known to a high precision, their relationship will be indeterminate and therefore it will not be possible to resolve the fringe ambiguity. This imposes a strenuous, but short-term only, requirement on the laser frequency stability. The second reason is that the laser wavelength is the length reference in the system, the "ruler" against which the measurements of L are compared. Of these two, it is the short-term requirement that is the more important: failure to maintain a consistent frequency over the short term will prevent our getting a measurement at all. In contrast, a slow drift of the central frequency will affect only the accuracy and in the case of differential measurements may not be critical.

The requirements on short-term frequency stability are that a value of order 100 kHz in the time of a measurement (c. 6 ms) is needed in order to avoid a degrading the effective signal-to-noise ratio of each shot. (For pre-amplified systems, the demand is a further order of magnitude in frequency stability (i.e. 10 kHz or thereabouts) to avoid degrading the estimate of the phase). In terms of long-term stability, we would need a frequency accuracy of 3 MHz (in the case of 10 meter long sensor elements) to ensure an accuracy of 1 mK on the temperature reading.

There are a number of well-established methods for referencing lasers to fundamentally-defined frequencies.

A measurement method embodying the present invention will now be described in further detail.

Firstly, a series of measurements are taken at a frequency $f_c$. In turn, the carrier frequency $f_c$ equals $f_0 \pm f_1 \pm f_2 + \Delta f$ and is determined by the frequency of the laser ($f_c$) shifted by one or more modulators ($f_1$, $f_2$) and the modulation frequency being varied by a small amount ($\Delta f$) between pulses, the variation of $f_c$ being sufficiently small that the phase relationship between successive measurements is known. The frequency interval might be chosen to ensure that the phase shift occasioned by the change in frequency is less than $2\pi$ radians, but equally phase shifts of a few cycles might prove to be manageable. For L=10 m, a frequency change of about 10 MHz corresponds to one full cycle.

Provided that the relationship between successive phase measurements can be determined with absolute confidence (with no $2\pi$ ambiguity), then the largest frequency interval meeting this criterion should be selected, since the derivative of the phase vs. frequency function can then be determined with a minimum number of measurements.

In practice, the actual length between reflectors should be known to a few %, simply on the basis that this value exceeds the long-term strength of the fiber. As an example of the relationship between the frequency range and the accuracy of the estimate of L, the number of cycles that can be passed in each frequency jump is roughly the reciprocal of the confidence with which the length is known a priori. Five cycles appears to be a safe limit, and thus a series of 10 equispaced measurements would cover 50 cycles. Thus for a signal-to-noise ratio of 100:1, the relative error on L, derived from the slope of the phase/frequency function, would be of order 5 ppm. This should give adequate confidence to jump a different frequency band. However, the use of a remotely-pumped amplifier is likely to improve the resolution by a further factor of >10.

In one approach to the planning of the frequencies used to probe the array, when the first series of measurements have been completed, a major shift in the frequency of the carrier is effected and a further sequence of phase measurements vs. carrier frequency is carried out.

Measurements are repeated at further major increments in source frequency as required for the absolute optical path length to be known to a desired level of accuracy.

Provided that the fringe order phase can be tracked over the major jumps in carrier frequency, there is no need to measure the phase at intermediate frequencies. To judge the consistency of such a set of measurements, take again the case of L=10 m. Assume that 10 measurements are taken at an approximate phase separation of 5 cycles, i.e. 50 MHz apart, covering 100*w* radian. The averaging intrinsic to the fitting process is expected to bring the uncertainty on the slope down to of order 5 ppm; this results in L being determined to a similar relative precision, i.e. 0.05 mm. If the major frequency jumps are of order 10 GHz, this corresponds to 1000 cycles, and given the precision with which L can be known from the short-span frequency scan, then the fringe order after the frequency jump can easily be correlated to that of prior measurements. (In the foregoing numerical example, after the jump, the new phase should be predicted by dead reckoning to <2% of one cycle, easily enough to unwrap the phase between frequency jumps, but not necessarily down to DC).

By using the maximum span of a currently-available IO modulators (40 GHz, including a side band on either side of the carrier), the phase should be known to 0.001 cycles in 4000, i.e. 1:4,000,000—not quite sufficient to determine the fringe order (assuming that the optical path length is within a few % of a nominal value). It follows that in general either greater frequency shifts still are required or further measurements must be made with a different source frequency.

The number of measurements required will depend, at least to some extent, upon the signal processing scheme adopted. It is thought that using one particular signal processing scheme, some 170 measurements will be required, which at a pulse repetition rate of 33 kHz will take <6 ms. At this rate, acoustic signals will also be picked up and some low-pass filtering may be required.

The foregoing assumed that the two polarizations travel without mixing. If this is not the case, then power is converted from one SOP to another and this can lead to partial (or even complete) fading of the interference and this is also a source of noise.

This risk of loss of polarization contrast must be addressed by ensuring that the birefringence of both the sensing and the downlead fiber is sufficient to avoid polarization conversion. This is relatively achievable for standard high-birefringence fiber. In the case of a side-hole fiber, it implies that there must be a strong built-in birefringence—in the same sense as the pressure induced birefringence. It also means avoiding tight bends and micro-bends. The latter requirement may run counter to the need to seal the pressure between sensor elements, in the application to pressure measurements as discussed below.

By definition, in birefringent fiber, one mode travels faster than its orthogonal counterpart. This polarization walk-off effect is cumulative from one reflector to the next. If the difference in the optical distance seen by the two orthogonal modes becomes significant compared to the distance between reflectors, it must be taken into account in the signal processing. It might be possible to compensate for this effect by exchanging the fast and slow axes, by forming splices in which one fiber is rotated by 90° with respect to the other.

Potentially, the most serious of all extraneous effects is the effect of changes in the phase during the acquisition of the measurement data. If the optical path length is changing very fast, it might be difficult for the surface electronics to acquire a consistent set of measurements between successive pulse repetition periods. If this is the case, it may be necessary to speed up the pulse repetition frequency, or possibly to reduce the frequency increments to provide a higher degree of redundancy in the information gathered.

In practice, these fast transients might come either from a rapid change in the desired measurand, e.g. temperature, or from an external perturbation, e.g. acoustic interference. Ensuring that the measurand is tracked implies a sampling rate much faster than that at which a significant phase change occurs. As an example, it is shown below that a 10 m gauge length will exhibit a phase change of a few 100 cycles for each K of temperature change. If sampling at 10 kHz and assuming 10 measurements are used in small-increment scanning, this implies that 1 K/s temperature ramp will cause an error of a few tenths of a cycle over the 50 cycles used in the example above. This level of error may be marginally capable of confusing the fringe-tracking algorithm and thus represents a rough estimate of the limiting rate of change in temperature which the system is expected to be able to handle.

More serious is the possible effect of acoustic noise coupling. If this turns out to be a significant problem, then it will be necessary to retain the individual phase measurements acquired over a reasonable time interval and average the phase obtained for each carrier frequency over that interval, thus, in effect, low pass-filtering the acoustic response. The drawback is of course that the transient response of the sensor array will also be slowed. However, if these acoustic effects turn out to be significant, acoustic information can also be derived from the data acquired The intrinsic relative phase sensitivity of a conventional fiber is $2.2 \times 10^{-12}$/Pa. Thus in our case, the total phase is $1.87 \times 10^7$ fringes (each equal to $2\pi$ rad) and thus the sensitivity to acoustic noise is 42 µrad/Pa. Whether or not this is significant depends entirely on the noise level downhole due to pump vibrations, flow noise and so on. The measurement and processing can be made more robust by minimising the unwanted phase variation for each sample. In turn, this may be achieved by increasing the pulse repetition frequency (PRF) and increasing the number of measurements used to derive L. The PRF is normally limited by the time taken for a pulse to travel from the surface electronics to the most remote point of interest and to return to the opto-electronics. If only the final section of the sensing fiber is of interest (and that contains reflectors), then the PRF can be increased above this limit: consider for example an array of 3 km length with a 7 km downlead. The total length (10 km) would normally restrict the PRF to 10 kHz, to ensure that only one pulse is present in the fiber at any one time. However, the light travelling to and from the array is of no interest and—subject to any splices being of adequately low reflectivity—therefore pulses can be launched at a rate limited only by the need to have only one pulse in the sensor array at any one time. In this example, the PRF is then limited to 33 kHz.

The pressure sensitivity of the fiber is also dependent on its coating. The example given above is for a bare fiber and applies at least approximately to a fiber with a thin, hard coating, e.g. 10 µm of polyimide.

In order to handle acoustic transients, it might be desirable to arrange to have two parallel acquisition arrangements, one at a fixed frequency and one with a variable interrogating optical frequency. The latter is used as explained above to deduce absolute path lengths. The former is used to sense acoustically induced phase changes and thus provides information to correct dynamic changes to the static measurands and at the same time provides a passive acoustic signal output.

Since the approach is capable of quite fast update rates, it offers the possibility of measuring pressure, or strain, from DC to a few kHz, i.e. from static measurements into the area where acoustic information is present. This data is obtained essentially "for free", although it may be preferable to use pairs of fibers, in the same cable structure (e.g. tube), one with a coating designed to minimise acoustic sensitivity (for DC measurements) and another used for acoustic measurements, with coatings designed to enhance acoustic sensitivity.

Another difficulty which exists is the cross-talk between sensor elements which arises because, for the more remote reflectors, the power reflected at a time corresponding to the position of these reflectors is intermingled with power arriving at the same time, but having undergone multiple reflections off nearer reflectors. The problem is well illustrated in patent specification U.S. Pat. No. 5,987,197. There are two effects arising from multiple reflections. The first is an increase in the shot noise, resulting from a greater level of optical power impinging on the detector. A more serious issue is that these unwanted reflections each shift the phase of the reflected signal slightly. Given that the system is interferometric, these spurious signals are proportional to the electric field amplitude, not optical power, and their effect, when considering the strength of the double reflection, is thus proportional to the reflectivity of a reflector, not the square of the reflectivity. In long arrays, there are many paths that can contribute to the signal arriving at a particular time. The problem is similar to that facing television reception in city centres, where the direct signal from the transmitter is mixed with other signals which have reflected from buildings in the vicinity.

In U.S. Pat. No. 5,987,197 the proposed solution is to make successive sensor elements from pairs of gratings, each pair being at a different wavelength band. Whilst this is effective at reducing the cross-talk, it is extremely inconvenient in the context of the approach proposed here, because each different wavelength implies either a different source or scanning one source at another wavelength band, thus multiplying the acquisition time by the number of wavelength bands used in the system. In the case of U.S. Pat. No. 5,987,197, this is probably not an issue because that concept is aimed at acoustic arrays only and there is therefore no scanning of the source as envisaged. Consequently, each wavelength band can be as narrow as the grating manufacturing technology and constraints relating to the environment of use permit (in practice, the temperature-dependence of the central wavelengths of the gratings would be a serious issue in oilfield applications).

Instead, it is proposed here to determine and correct the cross-talk term. Whilst cumbersome, this is possible to do because the first sensor element has no cross-talk, the second element can only suffer cross-talk from the first, and so on. It is therefore possible to subtract the cross-talk phasor on the second element due to double reflections in the first element from the measured second element phasor. The same process can be repeated successively for each array element, with, of course increasing complexity with increasing element number. Ultimately, the complexity and, more importantly, the accuracy of the correction may become intractable for long arrays, which may force a sub-division into smaller arrays, the arrays being interrogated at, for example, different wavelengths. Nonetheless, the corrective approach outlined above should allow the number of wavelengths used in the system to be reduced significantly and also allow arrays consisting of identical wavelengths to be constructed, with the significant benefit of requiring only a single grating between sensor elements, rather than two as in U.S. Pat. No. 5,987,197.

It would even be possible gradually to shift the grating wavelengths, such that there is significant overlap between adjacent gratings (since each must be wide enough to reflect at the design reflectivity over a range of wavelength sufficient for the laser frequency scan to determine the absolute sensor element unambiguously). With such an approach the laser would be scanned over a wider wavelength range than the reflectivity of a single grating, which restricts the number of alternative paths which can interfere with the signal for a particular array element.

If measurement time is of the essence, a certain degree of parallelism can be introduced by arranging for multiple acquisition sub-systems (detector, preamplifier and A/D converter with relating digital memory and data-reduction) to acquire different wavelength bands simultaneously. The source is then adapted to generate multiple pulse pairs (one in each of the wavelength bands into which the array is subdivided) at slightly different times (to avoid optical non-linear effects).

The signal-to-noise ratio (SNR) to be expected has been calculated for arrays having reflectors each of 0.2% reflectivity. The case of a passive down-hole array (7 km downlead followed by 3 km of sensing array) leads to an anticipated SNR of 100:1; the inclusion of a remotely pumped amplifier immediately prior to the sensor array 9 leads to an improved SNR of around 1500:1.

From a separate simulation, again for L=10 m and sampling at 100 to 200 MSPS, the phase resolution derived from a given SNR, the resulting phase resolution is of order 0.8/SNR radian. Thus for a SNR of 100:1, the fringe resolution is of order 0.0015 fringe for each of the frequencies. The uncertainty on the measurement of the group delay then depends on the uncertainty of slope of the fitted data.

In a sensor array 9 where the sensor elements are 10 m long, and light at 1550 nm is used (for which the group index N=1.484), it is believed that the phase can be resolved to $1/1000$ fringe, allowing the temperature to be determined to 4 μK.

Such sensitivity indicates an improvement greater than four orders of magnitude in the ability to read temperature array data. Such improvement would overcome the deficiencies in measuring temperature in horizontal well applications with current distributed temperature sensing technology. The fiber could possibly be blown or pumped into the well, provided that the reflectors are re-coated in such a way as to make the coated diameter the same as the fiber before gratings are inscribed.

Another application where the ability to detect minor temperature variations is extremely valuable is for detecting leaks in pipelines. It should provide the ability to detect much smaller gas leaks and also the location of minor constrictions in oil flowlines to identify early precipitation of waxes or hydrates, when there is plenty of time to rectify the situation.

In the case of measuring strain, it is proposed to use the change in birefringence of a high-birefringence fiber. These fibers are designed to include a high level of internal asymmetric stress caused by differential expansion coefficients. The birefringence is highly sensitive to temperature, but also to strain since the Poisson's ratio for the glass forming the stress-applying sectors and the remainder of the structure are markedly different. For a fringe resolution of $1/1000$ fringe, the strain resolution is expected to be of order 2 nε.

However, the temperature cross-sensitivity will need to be taken into account and compensated.

Given the predicted refresh rate, the measurement of strain according to the approach presented above would easily allow tracking of movements in risers, flowlines etc. This would allow potential damage (e.g. caused by land movement) to be identified before it occurs. There is also an application in measuring the pipe itself and it has been claimed that the measurement of strain over the surface of the pipe allow problems such as blockages and corrosion (which causes swelling) to be identified. Clearly any measurand that can be converted to strain is applicable to this measurement.

In the case of measuring pressure, one of the solutions is to use a side-hole fiber. These fibers exhibit a strong sensitivity of the birefringence to isostatic pressure (and a relatively low temperature sensitivity of the birefringence). Experience in these fibers indicates a pressure sensitivity of order $1/20$ fringes/psi/m. Thus for L=10 m and a fringe resolution of $1/1000$ fringe, the pressure resolution expected is 0.002 psi in 5 ms.

Figure 6:
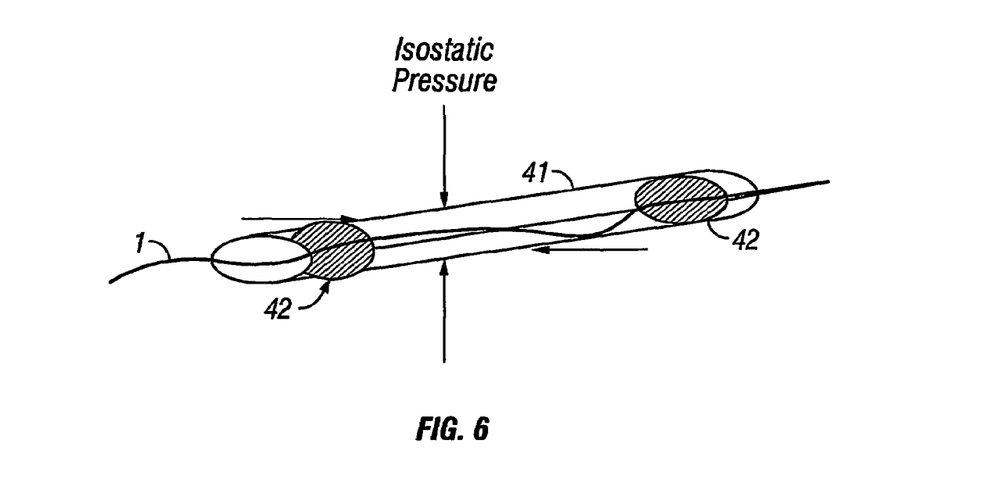
FIG. 6 shows a pressure sensor.

As indicated above, the use of a side-hole fiber would allow the pressure in each hydrocarbon zone to be measured, possibly to the same performance level as expected from crystal quartz gauges. One of the problems with distributed pressure sensing is the communication with the reservoir pressure. One solution is illustrated in FIG. 6. In essence, the sensing fiber 1 is placed in an elliptical tube 4, having seals 42 at each end, which is filled with a pressure-transmitting fluid, e.g. silicone oil. The tube 41 is sealed at each of the reflectors 2 and is over-stuffed with excess fiber to ensure that reasonable levels of strain are not transferred to the fiber 1. Pressure applied to the tube 41 is transferred to the sensing fiber 1 by elastic deformation of the tube 41: isostatic pressure tends to flatten the tube 41 (minor diameter will reduce still further), because the cross-sectional area of an ellipse is reduced as the major/minor axis ratio increases (i.e. the shape is flatter). This, in turn, tends to reduce the volume sealed in the tube 41, thus transferring the applied pressure to the fiber 1. The tube 41 thus acts as a stiff bellows.

This device, where the sensor elements are long, is particularly appropriate to horizontal wells, where gravity/density effects are small.

Of course, siting several tubes at different azimuths around the tubing would allow a determination of the fluid density and thus the water hold up. As a rough guide, for a 6⅝" tubing, the pressure differential across a vertical diameter is expected to be of order 0.20 psi, compared with 0.30 psi for mineral-laden water. Thus, with a resolution of 1 mpsi (which would take <1 s integration time), water hold-up could be measured up to a few %. However, in order to achieve this level of precision, the two fibers must be calibrated to the accuracy indicated above. This would probably have to be achieved with some sort of intervention, e.g. by ensuring that, temporarily, the fluid between the sensors is known.

With the anticipated pressure resolution, such sets of pressure sensors arrays, e.g. fitted at 90° around a production tubing, would allow the orientation of the four elements to be determined, purely from gravity. In turn, if sensor elements are integral to the tubing (as opposed to strapped on, possibly imprecisely), then the orientation of the tubing itself can be determined. This might then allow the tubing to be designed with orientation-specific characteristics (e.g. slots facing upwards only).

At the speed at which the transducer is expected to respond, it should be possible to track induced events. With a much improved sensitivity and speed of response, the approach is expected to work at far higher flow rates, allowing increased use of flowmeters based on hot-wire anemometry. In addition, the induced event need not be restricted to cooling or heating; for example, if a large bubble (or fluid with markedly different density from the production fluid) were injected into the fluid flow, then the density, as read between vertically-separated array elements (possibly by using separate arrays disposed around the periphery of the tubing) should detect a differential pressure change and thus the passage of a bubble.

In addition, it might be possible to track naturally occurring events. There exist thermodynamic fluctuations in most properties (certainly local temperature, pressure, density) of fluids. For example, imperfect mixing of fluids of different temperature, or density or pressure, may all be detectable at the :K, mpsi level.

Fibers with coatings designed to respond to particular measurands by stretching or shrinking could be applied to this interrogation approach.

For example, consider resistive arrays, which attempt to measure the approach of a waterfront to a borehole. In essence, these arrays measure very small voltages. If the fiber coating were electro-strictive (e.g. piezo-electric), then a small voltage applied across the coating could be used to sense small voltage. In this respect, the carbon coating applied to certain fiber types is conductive (at least enough for the slow response times needed here), which means that the bottom electrode is already present on such fibers. Sensitivities reported [See Imai et al, Journal of Lightwave Technology, v LT5, p 926-931, 1987] for PVDF piezoelectric coatings are of order $10^{-5}$ rad/m/(V/m) for a 60 μm coating thickness. Thus in this case, a 1 mV voltage applied across such a coating would result in a phase change of about 1.6 mrad. If the resolution is of order 0.01 rad, 36 measurements would be required to resolve 1 mV in a 10 m sensor element, i.e. about 3.6 ms at a PRF of 10 kHz, i.e. a 1 hour averaging time required to reach 1 μV. It is clear that very careful temperature compensation would be required to reach this level of accuracy. Similarly, magneto-strictive coatings have been used to measure magnetic fields and they could be used in this context for the measurement of magnetic fields and electric current.

Alternatively, specialised coatings designed to respond to specific chemical species by straining the fiber could be employed as chemical detectors.

The present system can thus be used to measure any two of the following parameters simultaneously: pressure, temperature, and strain, which measurements as disclosed above can be used to infer other parameters (such as chemical, electrical, and magnetic properties).

It has been shown above how pressure and strain can be measured together with temperature. It may be necessary to measure all three parameters simultaneously. This might involve fibers having different pressure and strain sensitivity combinations. One example would be a "pure" side-hole fiber and another side hole fiber which might also contains stress-applying sectors. Ideally these fibers would be held together (e.g. in the same jacket, such as in a 2-fiber ribbon) or a more complex glass structure might contain several cores, say one core sited between a pair of side-holes and the other between a pair of stress-applying sectors.

The invention claimed is:

1. A method of measuring at least one selected parameter at a location within a region of interest, which method comprises the steps of:

launching optical pulses at a plurality of preselected interrogation wavelengths into an optical fiber deployed along the region of interest, reflectors being arrayed along the optical fiber to form an array of sensor elements, an optical path length between the said reflectors being dependent upon the selected parameter;

detecting the returned optical interference signal for each of the preselected wavelengths; and determining from the optical interference signal an absolute optical path length between two reflectors at the said location, and from the absolute optical path length so determined, the value of the selected parameter at the said location, wherein the step of determining the absolute optical path length comprises carrying out a process in which the derivative of the phase as a function of wavelength is estimated from a subset of the interference signals, using the derivative and an estimated value for the optical path length to estimate the phase relationship between the interference signals, and the phase relationship thus obtained is used to revise the estimated value for the optical path length, the process being repeated for increasing subsets of the remaining wavelengths in sequence, on the basis of the optical path length estimated for the immediately preceding subset in the sequence, thereby to progressively revise the optical path length until it is known to a desired level of accuracy.

2. A method as claimed in claim 1, wherein said optical fiber comprises polarization-maintaining fiber and light is launched into the fiber in such a way that the power of the light signal is substantially equally divided between the orthogonally-polarized propagation modes of the fiber, thereby to interrogate each principal state of polarization of the fiber simultaneously, the return interference signals from both principal states of polarization being used separately in the said process for determining the absolute optical path length for each propagation mode independent of the other mode.

3. A method as claimed in claim 1, wherein the optical fiber comprises polarization-maintaining fiber and light is launched into the fiber in such a way that the power of the light signal is firstly directed entirely into one of the principal states of polarization and then the other, thereby to interrogate the principal states of polarization sequentially, the returned interference signals from both principal states of polarization being used separately in the said process for determining the absolute optical path length for each propagation mode independent of the other mode.

4. A method as claimed in claim 1, in which the selected parameter comprises temperature.

5. A method as claimed in claim 1, in which the selected parameter comprises strain.

6. A method as claimed in claim 5, wherein the optical fiber is a high-birefringence fiber, the birefringence of which changes in response to strain applied to the optical fiber.

7. A method as claimed in claim 6, wherein the birefringence of the high-birefringence fiber also changes in response to temperature, and the method further comprises compensating the returned optical interference signal for effects arising from temperature at the said location.

8. A method as claimed in claim 1, in which the selected parameter comprises pressure.

9. A method as claimed in claim 8, wherein the said optical fiber comprises a side-hole fiber.

10. A method as claimed in claim 9, wherein each sensor element of the fiber is located within a sealed elliptical tube filled with a pressure-transmitting fluid.

11. A method as claimed in claim 1, wherein the selected parameter depends on a localized event moving along the region of interest, and the method comprises determining the value of the selected parameter over time at more than one said location, and determining the movement of the localized event from the determined values of the selected parameter.

12. A method as claimed in claim 11, wherein the localized event is a user-induced event, and the method further comprises inducing the localized event.

13. A method as claimed in claim 11, wherein the localized event is a volume of fluid within the region of interest that has a different temperature, pressure, or density from surrounding fluid in the region of interest, the selected parameter being temperature, pressure, or density, respectively.

14. A method as claimed in claim 1, wherein at least two selected parameters are measured simultaneously.

15. A method as claimed in claim 1, wherein the measured value for the parameter is used to determine the value for a further measurand dependent upon the said parameter and wherein the said optical fiber is provided with a coating which responds to the said further measurand by stretching or shrinking.

16. A method as claimed in claim 15, wherein the said coating is electro-strictive.

17. A method as claimed in claim 15, wherein the said coating is magneto-strictive.

18. A method as claimed in claim 15, wherein the said coating is sensitive to a selected chemical measurand.

19. A method according to claim 1, wherein the region of interest lies within an oil well.

20. Apparatus for measuring a selected physical parameter at a location within a region of interest, which apparatus comprises:
an optical fiber for deployment along the region of interest, the optical fiber having reflectors therealong forming an array of sensor elements, an optical path length between the said reflectors being dependent upon the selected parameter;
source means operable to launch optical pulses at a plurality of preselected interrogation wavelengths into the said fiber;
signal detection means operable to detect the returned optical interference signal for each of the preselected wavelengths; and
signal processing means operable to determine from the optical interference signal an absolute optical path length between two reflectors at the said location and to determine from the absolute optical path length the value of the selected parameter at the said location,
wherein the said signal processing means is operable to determine the absolute optical path length by carrying out a process in which the derivative of the phase as a function of wavelength is estimated from a subset of the interference signals, using the derivative and an estimated value for the optical path length to estimate the phase relationship between the interference signals, and the phase relationship thus obtained is used to revise the estimated value for the optical path length, the process being repeated for increasing subsets of the remaining wavelengths in sequence, on the basis of the optical path length estimated for the immediately preceding subset in the sequence, thereby to progressively revise the optical path length until it is known to a desired level of accuracy.

21. Apparatus as claimed in claim 20, wherein the said optical fiber comprises polarization-maintaining fiber, and the apparatus further comprises power launching means operable to launch the optical pulses into the fiber in such a way that the power of the optical pulses is substantially divided between the orthogonally-polarized propagation modes of the fiber, thereby to interrogate each principal state of polarization of the fiber simultaneously; and the signal processing means being operable to use the returned optical interference signals from both principal states of polarization separately to determine the absolute optical path length for each propagation mode independent of the other mode.

22. Apparatus as claimed in claim 20, wherein the said optical fiber comprises polarization-maintaining fiber, and the apparatus further comprises a polarization modulator operable to launch the optical pulses into the fiber in such a way that the power of the optical pulses is firstly directed entirely into one of the principal states of polarization of the fiber and then the other, thereby to interrogate the principal states of polarization sequentially; and the signal processing means being operable to use the returned optical interference signals from both principal states of polarization separately to determine the absolute optical path length for each propagation mode independent of the other mode.

23. Apparatus as claimed in claim 20, wherein the parameter comprises temperature.

24. Apparatus as claimed in claim 20, wherein the parameter comprises strain.

25. Apparatus as claimed in claim 24, wherein the optical fiber is a high-birefringence fiber, the birefringence of which changes in response to strain applied to the optical fiber.

26. Apparatus as claimed in claim 25, wherein the birefringence of the high birefringence fiber also changes in response to temperature, and the signal processing means is further operable to compensate the returned optical interference signal for effects arising from temperature at the said location.

27. Apparatus as claimed in claim 20, wherein the parameter comprises pressure.

28. Apparatus as claimed in claim 27, wherein the said optical fiber comprises a side-hole fiber.

29. Apparatus as claimed in claim 28, wherein each sensor element of the fiber is located within a sealed elliptical tube filled with a pressure-transmitting fluid.

30. Apparatus according to claim 20, wherein the selected parameter depends on a localized event moving along the region of interest, and the signal processing means is operable to determine the value of the selected parameter over time at more than one said location, and to determine the movement of the localized event from the determined values of the selected parameter.

31. Apparatus according to claim 30, wherein the localized event is a user-induced event.

32. Apparatus according to claim 31, wherein the localized event is a volume of fluid within the region of interest that has a different temperature, pressure, or density from surrounding fluid in the region of interest, the selected parameter being temperature, pressure, or density, respectively.

33. Apparatus as claimed in claim 20, and further for measuring a second selected physical parameter at the location within the region of interest, wherein said optical path length between the said reflectors is further dependent upon the second selected parameter; and the signal processing means is further operable to determine the value of the second selected physical parameter from the determined absolute optical path length.

34. Apparatus as claimed in claim 20, operable to use the measured value for the parameter to determine a value for a further measurand dependent upon said parameter, and wherein the said optical fiber is provided with a coating which responds to the said further measurand by stretching or shrinking.

35. Apparatus as claimed in claim 34, wherein the said coating is electro-strictive.

36. Apparatus as claimed in claim 34, wherein the said coating is magneto-strictive.

37. Apparatus as claimed in claim 34, wherein the coating is designed to be sensitive to a selected chemical measurand.

38. Apparatus as claimed in claim 20, wherein the source means are operable to launch light at a fixed wavelength and at a varying wavelength into the fiber, and the signal processing means are operable to use the interference signal from interrogation at the fixed wavelength to determine high frequency phase changes.

39. Apparatus as claimed in claim 38, further comprising an auxiliary optical fiber for deployment through the region of interest, reflectors being arrayed along the fiber to form an auxiliary array of sensor elements, the source means being operable to launch the fixed wavelength signal into the auxiliary fiber.

40. Apparatus as claimed in claim 39, where the auxiliary fiber has a coating designed to enhance acoustic sensitivity.

41. Apparatus as claimed in claim 38, wherein the signal processing means are further operable to use the high frequency phase changes to correct for dynamic errors in the returned optical interference signals.

42. Apparatus according to claim 20, wherein the region of interest lies within an oil well.

* * * * *